UNITED STATES PATENT OFFICE.

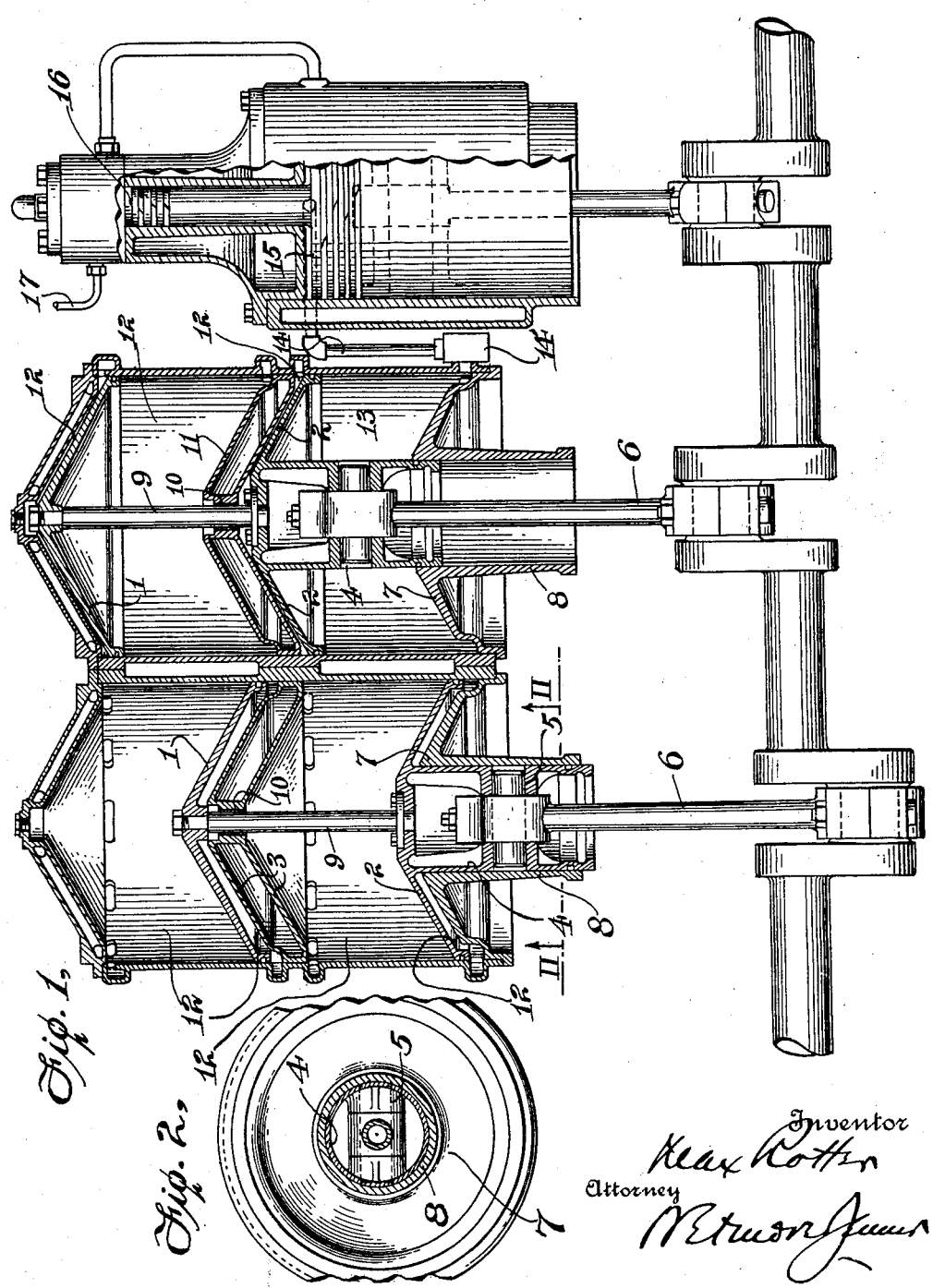

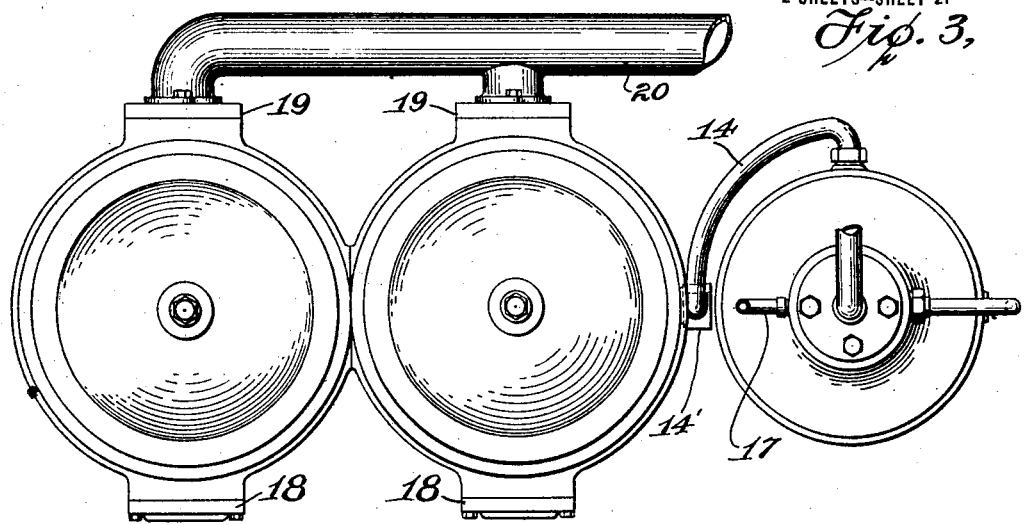
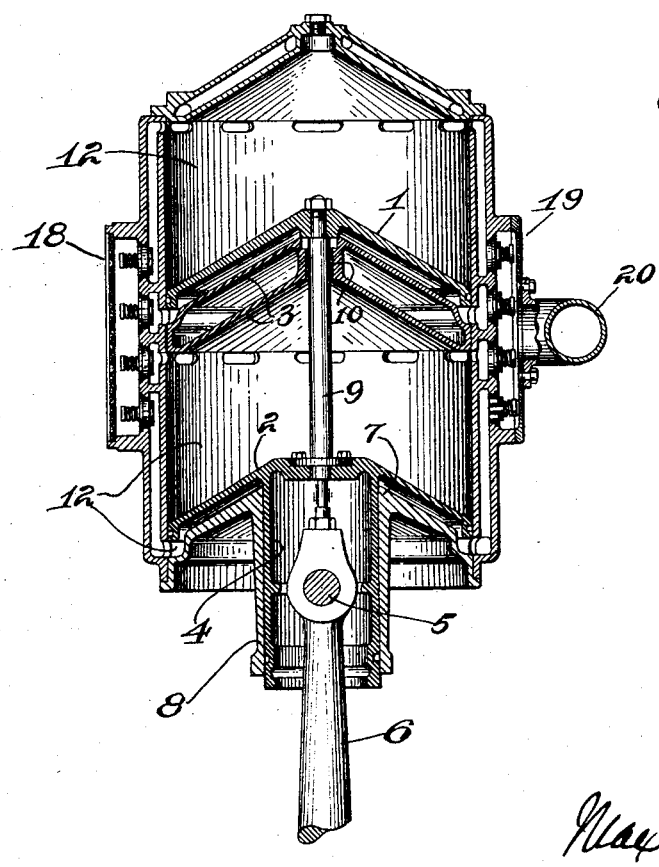

MAX ROTTER, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

ENGINE AIR-COMPRESSOR.

1,387,515.   Specification of Letters Patent.   Patented Aug. 16, 1921.

Application filed September 12, 1917. Serial No. 190,886.

*To all whom it may concern:*

Be it known that I, MAX ROTTER, citizen of the United States, residing in St. Louis, Missouri, have invented the following described Improvements in Engine Air-Compressors.

The invention is an improvement in the general arrangement and specific structure of air compressor mechanism for multi-cylinder Diesel engines and particularly such engines and similar engines as are designed on the two-stroke cycle for use in the propulsion of vessels in which use considerations of space and weight are of special importance. According to the present invention the air compressing department of the engine power plant is represented by one or more low pressure pump cylinders giving a large volume delivery for scavenging purposes and a two-stage air compressor for the fuel injection air, all driven from the engine crank-shaft and compactly related thereon so that the shaft may be as short as possible. The scavenger pistons are double acting and are made of sufficient stroke and diameter not only to serve the several engine cylinders with scavenging air but also to permit one side of one of them to serve as the first or low pressure stage of the injection compressor thereby economizing on the space required for the latter. The said pistons are arranged in tandem, the lower one having a trunk guide to serve as a cross-head for itself and the upper piston and the structure of the cylinder head adjacent such piston forms the slideway bearing for such trunk, being specially formed for that purpose so that the light weight scavenger pistons may be satisfactorily employed for the purposes stated and as hereinafter pointed out.

In the accompanying drawing,

Figure 1 is a general longitudinal section through the scavenger air and the fuel injection air cylinders unnecessary parts being omitted; and Fig. 2 is a cross section on line II—II of Fig. 1. Fig. 3 is a top plan and Fig. 4, a vertical transverse section through one of the cylinders.

Referring to the drawing, the low pressure pistons are arranged in pairs in vertical, tandem arrangement, the upper pistons being marked 1 and the lower pistons 2. Their respective cylinders may be water-jacketed and are to be understood as provided with proper inlet valve chests 18 and outlet valve chests 19, the latter delivering to the manifold 20 as indicated in Figs. 3 and 4. The valve organization of the pumps forms no part of the present invention and may be of any type or form considered best adapted to the conditions. All the pistons are double acting and of conical or frusto-conical shape, which shape permits them to be made of very thin metallic sections and with correspondingly light weight. The cylinder heads and the dividing wall 3 between tandem cylinders are of the same shape as the pistons and for the same reason. In each pair of pistons and cylinders, the lower piston marked 2 is formed in one piece with a cylindrical trunk part 4 and the piston pin 5 for the connecting rod 6 is mounted in such part. The adjacent cylinder head 7 is provided with a relatively long tubular boss 8 extending downwardly from its apical region toward the engine crank shaft and embracing and forming a guideway bearing for the trunk part 4 of the piston, which latter is provided with piston rings as indicated bearing on the inner side of the tubular boss. In marine engines wherein the distance from the piston to the crank shaft is limited by reason of natural limitations on the over-all height of the engine, short connecting rods are necessary and the guideway 8 in the present case is thus called upon to resist a considerable lateral pressure from the crank, none of which can safely be transmitted to the pistons because of the thinness of their sections. Notwithstanding that these pressures are likely to be severe in practice, I have ascertained that the parts which have been termed the guideway or boss should be made of circular cross-section, substantially from end to end and should project freely into the space between the lower cylinder head and the crank shaft without reinforcing ribs or angle-bracing such as is commonly supplied to the angles of castings as reinforcement. The guideway bearing 8 it will be noted is thus of true circular cross section from its point of junction with the cylinder head proper 7 to its lowermost end. It is also of adequate thickness, of itself, to give the requisite lateral support to the trunk 4 of the lower piston. With such formation it may still be light in weight and being exposed to the air it is found in practice to be entirely free from tendency to bind upon the trunk 4 when the apparatus attains its operating temperature. It should be noted that this is the only cylinder head of the compressor apparatus which is not water jacketed, the exposed area of the part 8 serving to assist in dissipation of heat from the cylinder head 7.

The upper piston 1 of each pair of pistons, is connected to its corresponding lower piston by a rod 9 bolted to the head part of the trunk 4 and extending through a bearing 10 in the water-jacketed dividing wall 11 between upper and lower cylinders. In the double pair arrangement of scavenger cylinders as shown in the drawing, the several pumping spaces marked 12 are to be understood as connected in any suitable way to supply the scavenger ports of an internal combustion engine. In the present instance one of the pumping chambers marked 13, is connected through a suitable outlet valve 14' and pipe 14, with the two-stage injection air pumps having pistons 15 and 16 and a delivery pipe 17. By duplicating pump structures instead of using a single pump of requisite capacity and by air-cooling the lower cylinder heads of each pump structure by the means above described, it is possible, as will now be apparent, to keep the overall vertical dimension and the weight of the air compressor department within minimum limits and without unduly shortening the length of the piston rods 6.

Claims.

1. In marine air-compressing apparatus, the combination of adjacent scaveneger pumps, each having tandem-arranged pistons, the lower piston of each pump having a trunk and the lower cylinder head of each pump having a long, air-cooled bearing for said trunk, of circular section, extending freely in the direction of and around the connecting rod of said piston.

2. In marine air-compressing apparatus, the combination of adjacent scavenger pumps each having tandem-arranged frusto-conical pistons, the lower piston of each pump having a trunk formed in one piece therewith and the lower cylinder head of each pump being also frusto-conical and having an air-cooled tubular bearing serving as a guide for said trunk.

In testimony whereof I have signed this specification.

MAX ROTTER.